J. H. TAYLOR.
MECHANICAL MOVEMENT.
APPLICATION FILED MAR. 13, 1917.
1,237,125.
Patented Aug. 14, 1917.
2 SHEETS—SHEET 2.
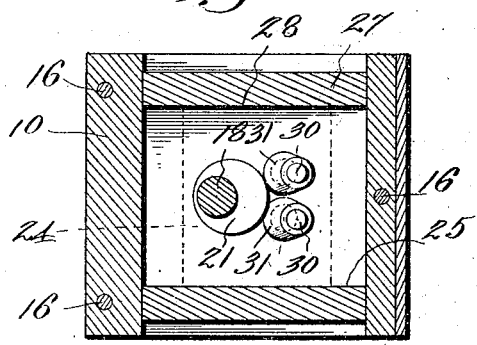
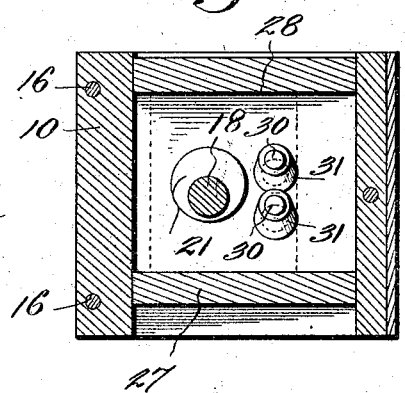
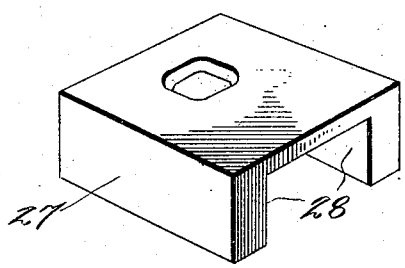
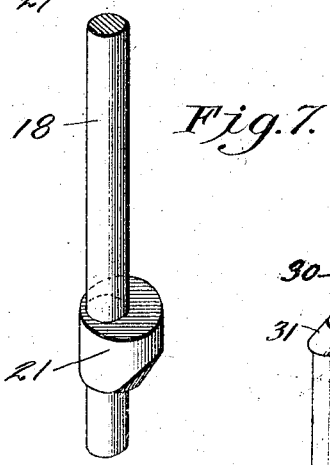
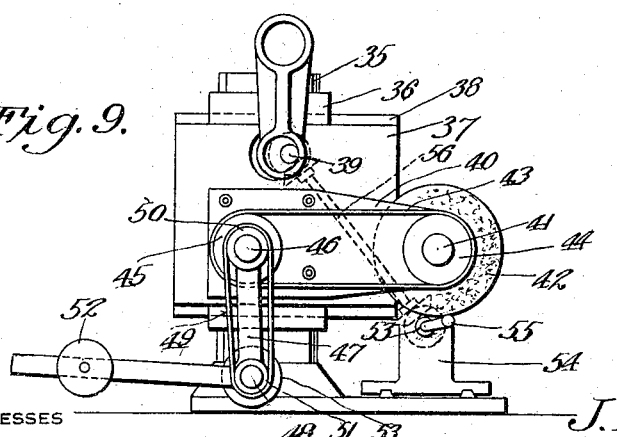
INVENTOR
J. H. Taylor,
BY Victor J. Evans
ATTORNEY
WITNESSES

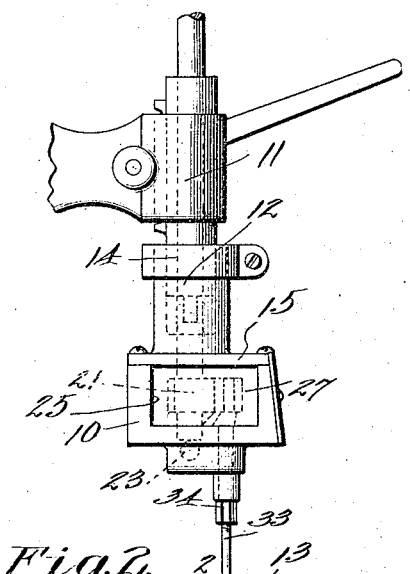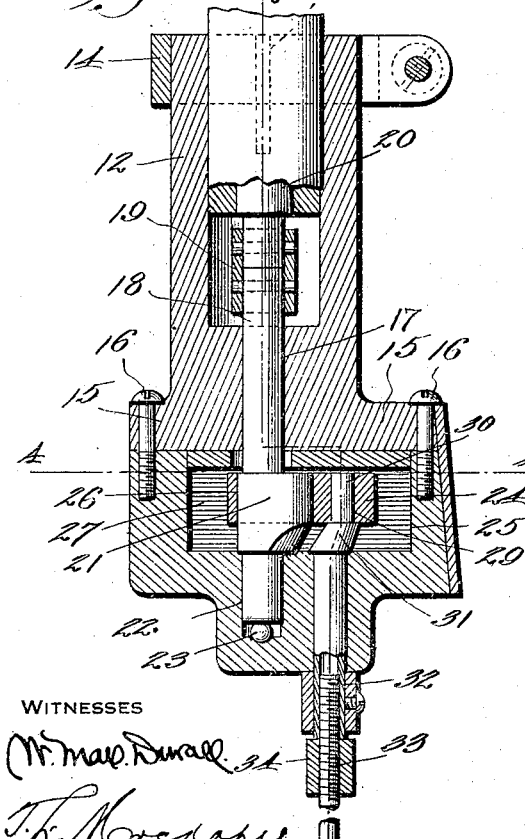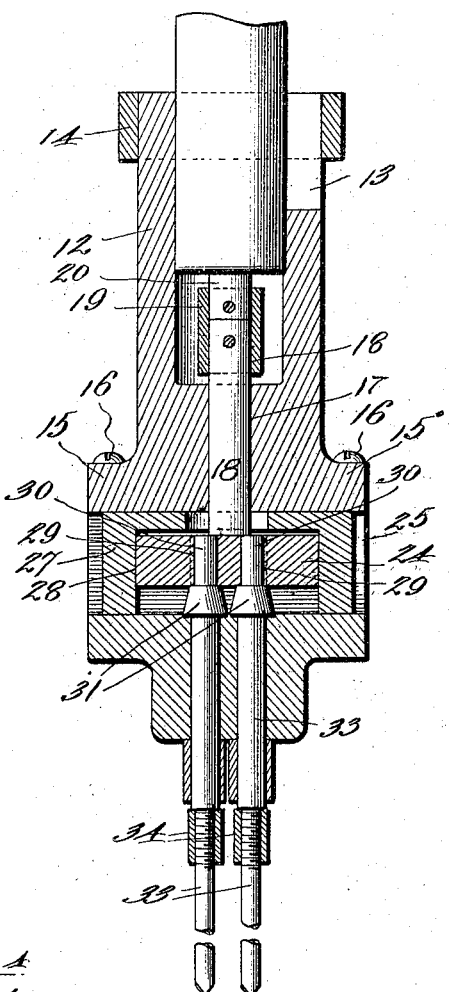

UNITED STATES PATENT OFFICE.

JOHN H. TAYLOR, OF PITTSFIELD, MASSACHUSETTS.

MECHANICAL MOVEMENT.

1,237,125.  Specification of Letters Patent.  Patented Aug. 14, 1917.

Application filed March 13, 1917. Serial No. 154,531.

*To all whom it may concern:*

Be it known that I, JOHN H. TAYLOR, a citizen of the United States, residing at Pittsfield, in the county of Berkshire and State of Massachusetts, have invented new and useful Improvements in Mechanical Movements, of which the following is a specification.

This invention relates to new and novel mechanical movements.

The primary object of the invention is the production of a movement by means of which a single rotating shaft may be caused to rotate a plurality of shafts without the employment of gears or cranks, it being possible to locate the shafts at any desired point relative to the driving shaft, and to operate them in any number.

Another object of the invention is to provide a movement of the character set forth which may be operated by a minimum amount of power and will be practically noiseless in its operation.

A further object is the provision of a device of the above type which is of simple construction and operation and is constructed in a manner to permit of its being easily taken apart for purposes of cleaning and repairing.

With the above and other objects in view the invention consists of a bearing block provided with a slide bearing, said bearing block being also provided with a floating member having a channel therein arranged at right angles to the bearing of the said block, an operating block movable within said floating member and sliding bearing, an operating shaft provided with an eccentric for engagement with the crank operating block.

In the drawings;

Figure 1 is a side elevation of the invention illustrating its use in connection with the drill brace;

Fig. 2 is a vertical sectional view of the same;

Fig. 3 is a detailed vertical section through the operating block and its contiguous parts, said section being taken at right angles to Fig. 2;

Fig. 4 is a sectional plan view on the line 4—4 of Fig. 2 illustrating the relation of the operating shaft and its eccentric to the spindle receiving cranks, the operating block being shown in outline by dotted lines;

Fig. 5 is a similar view illustrating the position of the parts;

Fig. 6 is a detailed perspective view of the floating member;

Fig. 7 is a similar view of the shaft which carries the eccentric;

Fig. 8 is a detailed perspective view of one of the spindle receiving cranks; and Fig. 9 is an elevation of a grinding machine, illustrating another use of the invention.

While the invention is shown and described as applied to a drill, it is susceptible of various other uses, for example, it may be used in connection with a grinding machine for grinding engine crank shafts as is also illustrated and described.

Referring to the drawings in detail and more especially to Figs. 1 to 8 inclusive, the invention comprises a bearing block 10 of any suitable design or configuration. This block is designed to be attached to a drill or other machine, a portion of a drill being illustrated at 11 and being provided with an attaching sleeve 12. The sleeve 12 is split as at 13 and is designed to receive the portion 11 of the drill brace and to be secured thereto by means of a clamp 14.

The sleeve 12 is formed with a flange 15 of substantially the same size and shape as the bearing block and is attached thereto through the medium of screws 16. The lower portion of the sleeve is provided with an opening 17 for the purpose of providing a bearing for an operating member in the form of the shaft 18. This shaft has attached thereto a coupling 19, by means of which it is connected to the spindle 20 of a single spindle drill. This spindle represents the driving member of the movement and while shown as a driving spindle of the drill, it may be any other driven shaft as will later appear. The shaft 18 is provided with an eccentric 21 and has its lower end working within a bearing 22 formed in the bearing block 10, the said bearing being provided with a bearing ball 23 on the bottom thereof for the purpose of reducing friction.

The operating block 24 is adapted to operate within a slide bearing 25 formed by channeling out the block 10 in the manner shown. The operating block 24 is formed with an opening 26 which is adapted to have a working fit around the eccentric 21 so that a rotation of the shaft 18 will operate the crank operating block. Also operating within the sliding bearing 25 of the block 10, is a floating member 27, which is channeled as shown at 28 for the reception of the block 24, which has a sliding fit therein. The channel 28 of the member 27 is arranged at right angles to the slide bearing 25, so that the operation of the shaft 18 will cause the floating member 27 to have a reciprocatory movement within the bearing 25, while the operating block 24 will have a reciprocatory and rotary movement, the reciprocatory movement being at right angles to the movement of the member 27, this operation being accomplished through the eccentric engagement of the shaft 18 with the block 24 and the floating member 27. The block 24 is provided with a plurality of openings 29 adapted to receive the offset portions 30 of the spindle receiving cranks 31. While there is shown in the drawings only two of such openings, it is of course apparent that any desired number may be employed. The outer end of the cranks 31 are formed as shown for the purpose of receiving the threaded ends 32 of the drills 33, the said drills being provided with a collar 34 to limit their insertion within the cranks 31. The offset portions 30 of the cranks 31 have the same throw as the eccentric 21, so that the easy operation of these cranks is sure in either direction. The cam 21 and the cranks 31 are beveled as shown in order to provide for their close arrangement and the consequent economy of space.

In Fig. 9 is illustrated the application of the movement to a grinding machine. In this figure there is illustrated a pedestal 35, which has slidably mounted thereon a floating member 36, and in this member is the operating block 37, the said block being dove-tailed within the member 36 as shown at 38. The block 37 is operated by the eccentric shaft 39, which causes the said block to have a reciprocatory and rotary movement. The block 39 carries a bracket 40, which provides a bearing for a shaft 41 upon which is mounted a grinding wheel 42. This wheel is driven by a belt 43 which engages a pulley 44 on the shaft 41 on the pulley 45 upon a shaft 46. The shaft 40 is mounted in one end of a bell crank lever 47, which is pivoted at 48 upon the pedestal 35. The wheel 45 is driven through the medium of a belt 49 which engages a pulley 50 on the shaft 46 and a pulley 51 on the shaft 48. The opposite arm of the bell crank 47 has mounted thereon an adjusting weight 52. An additional pulley 53 is mounted upon the shaft 48 which may be driven by power from any suitable source.

The engine crank which is designed to be ground by the wheel 42 is shown at 53, as mounted in a bearing 54. The crank portion 55 of this shaft engages the face of the wheel 42, while the opposite end of the shaft is designed to be driven through the shaft 39 through the medium of suitable beveled gearing and the shaft 56, which shaft is shown in dotted lines. It is not thought necessary to illustrate this gearing as any suitable beveled gearing or other gearing may be utilized for rotating the shaft 53 within the bearing 54.

It will be seen that as the block 37 is operated through the shaft 39 it will be given a rotary and reciprocatory movement, which movement will cause the shaft 41 to move in a circle, and as the crank shaft 53 is rotated the crank 55 will be always in engagement with the wheel 42 but will present a different portion for grinding during its rotation. By mounting the driving pulleys for rotating the wheel 42 upon the bell crank in the manner shown, the pulleys are always maintained in a proper working condition.

It is thought from the foregoing that the construction, operation and uses of the device will be plain and that it is therefore unnecessary to enter into a further detailed description thereof. The right is reserved to make such changes in the form and proportion of the invention as will fall within the scope of the claims hereto appended.

Having described the invention, what is claimed, is:—

1. A device of the class described comprising an operating shaft, an eccentric thereon, an operating block controlled by the said shaft, a floating member coöperating with the operating block and cranks having an operative engagement with the said operating block.

2. A device of the class described comprising an operating shaft, an operating block controlled by said shaft, a floating member coöperating with the said operating block and cranks having an operative engagement with the said block.

3. A device of the class described comprising a rotatable and reciprocatory operating block, a floating member slidable upon said block, a bearing for said floating member and cranks having an operative engagement with said operating block.

4. A device of the class described comprising an eccentrically driven operating block, a channeled floating bearing slidable upon said block, a bearing for said floating member, the channel of which is arranged at right angles to the movement of the operating block and cranks having an operative engagement with the said operating block.

5. A device of the class described comprising a bearing block, a floating member within said bearing block, said floating member being provided with a channel, an operating block movable within the floating member and within the sliding member of the bearing block and cranks engaging said bearing block.

In testimony whereof I affix my signature.

JOHN H. TAYLOR.

Witnesses:
 LELA M. COLE,
 JNO. J. WHITTLESEY.